Dec. 8, 1959    H. P. TROENDLY ET AL    2,916,124
ONE-WAY CLUTCH
Filed Dec. 20, 1954
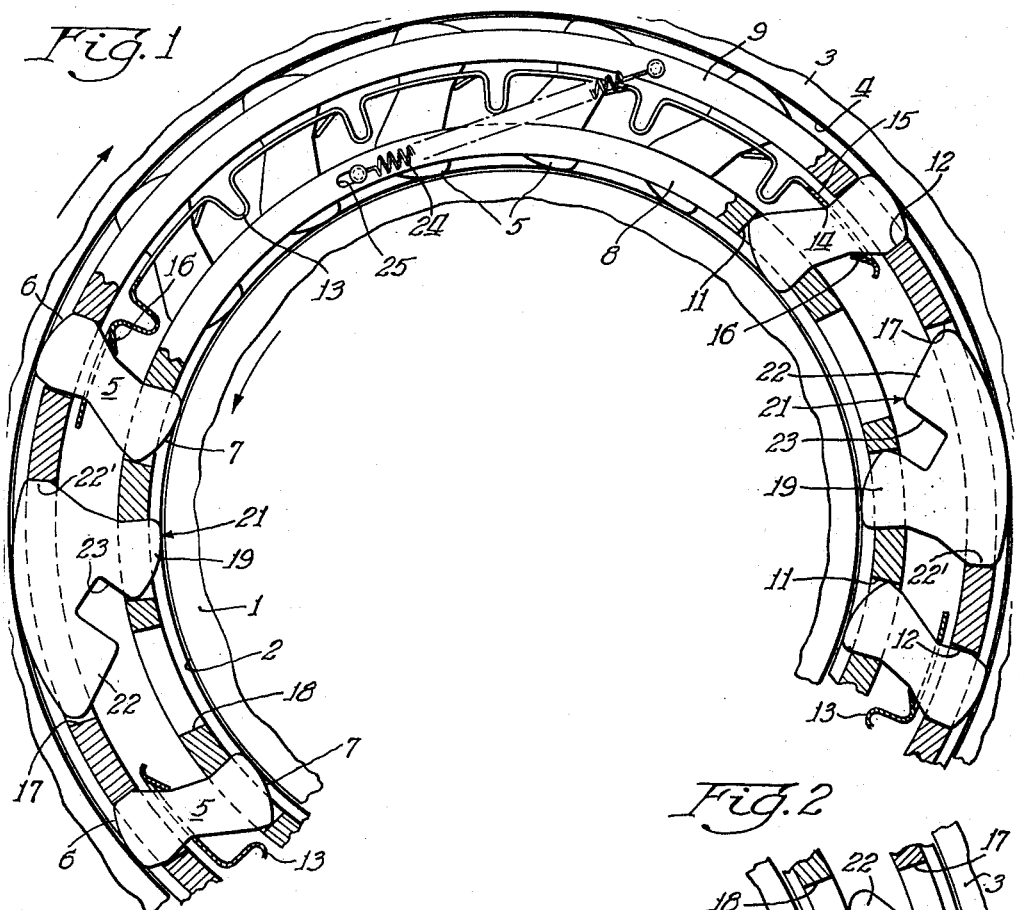
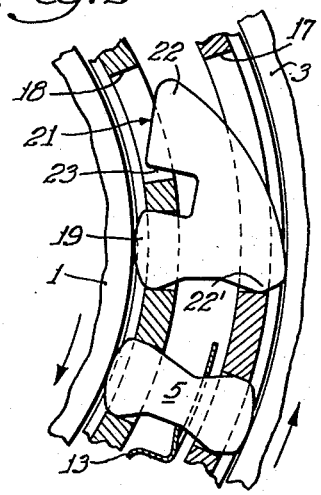
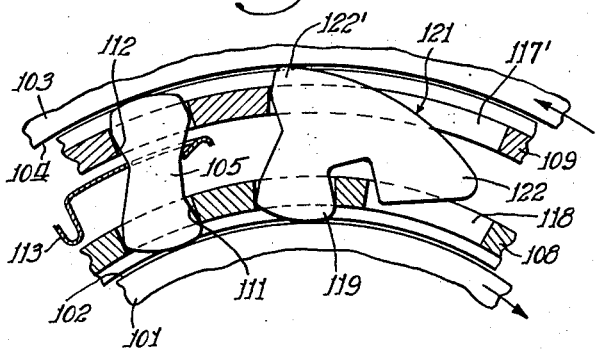
Inventors:
Harry P. Troendly
and Ernest A. Ferris
By: Donald W. Banner, Atty.

United States Patent Office 2,916,124
Patented Dec. 8, 1959

2,916,124

ONE-WAY CLUTCH

Harry P. Troendly, La Grange Park, and Ernest A. Ferris, Elmhurst, Ill., assignors to Borg-Warner Corporation, Chicago, Ill., a corporation of Illinois Application December 20, 1954, Serial No. 476,362

14 Claims. (Cl. 192—45.1)

This invention relates to one-way engaging devices, and more particularly to one-way engaging devices incorporating sprags or grippers disposed between a pair of races, the grippers being spaced apart and controlled by a pair of radially spaced and relatively movable cages, means being provided either to disengage the sprags completely from one of the races under certain conditions or to hold the sprags in engagement with the races under said conditions.

In certain installations, substantial wear is experienced in sprag clutches during their overrunning conditions at excessive speed in which the freewheel drag of the sprags against one of the races results in abnormal and undesirable wear of the sprags and the race surfaces. It is, therefore, desirable to lift the sprags from engagement with one of the races during these high speed overrunning conditions to eliminate this wear.

In order to accomplish this purpose, it has been found to be particularly desirable to employ a sprag clutch incorporating a plurality of sprags which extend through suitable openings in a pair of radially spaced and relatively rotatable cages, the openings closely receiving the sprags, one or more centrifugally responsive weights being enclosed by the cages to effect relative rotation therebetween upon the attainment of undesirable high speed conditions, whereupon the cages—by such relative movement—effect lifting of the sprags from one of the race surfaces.

In certain other installations, it has been found to be desirable to ensure that the sprags remain in engagement with both of the races during overrunning of the device— despite the wear to which they are thereby subjected—so that they will be in a position to reengage wedgingly between the races immediately upon a reversal of relative direction of rotation of the races. That is to say during overrunning condition in which centrifugal force would normally tend to lift the sprags out of engagement with the inner race, for example, it has been found desirable that means be provided which will keep these sprags in engagement with both of the races despite this tendency.

In order to accomplish this purpose, it has been found to be desirable, simple, and economical to incorporate with a pair of relatively rotatable cages and sprags enclosed thereby an additional, centrifugally responsive element enclosed by the cages which will, in response to centrifugal force, operate to maintain the relative positioning of the cages such that the sprags will be maintained in engagement with both of the races.

It is, therefore, one object of the present invention to provide an improved one-way engaging device incorporating sprags and a pair of radially spaced and relatively rotatable cages having openings receiving the sprags, in which means are provided to effect relative rotation of the cages in a predetermined direction in response to the speed of rotation of the unit to move the sprags away from one of the races, or to hold the sprags in engagement therewith.

Another object of the present invention is to provide a device in accordance with the preceding object in which one or more weights are suitably positioned within the cages so as to be substantially enclosed thereby, the weights being so constructed and arranged as to effect relative rotation between the cages upon the attainment of high speeds in the unit whereby the sprags are lifted from one of the races, or if desired are maintained in engagement therewith.

Another object of the present invention is the provision of a device in accordance with the preceding objects in which elongated, centrifugally responsive weight means are mounted within and so as to extend through suitable openings in the inner and outer cages.

Another object of the present invention is the provision of an improved one-way engaging device incorporating sprags which extend through, and are closely received by, suitable openings in a pair of relatively rotatable and radially spaced cages, in which weight means are provided within and engaging the cages sufficiently to effect relative rotation therebetween whereby movement of the weight means in response to centrifugal force effects relative rotational movement between the cages so that all of the sprags are lifted free of one of the race surfaces.

Another object of the present invention is the provision of an improved one-way engaging device incorporating sprags which extend through, and are closely received by, suitable openings in a pair of relatively rotatable and radially spaced cages, and weight means which are provided within the cages operative to effect relative rotation therebetween whereby movement of the weight means in response to centrifugal force controls relative rotational movement between the cages in a manner such that all of the sprags are maintained in engagement with both of the race surfaces despite their inherent tendency to lift off of one of said race surfaces.

Other objects and features of the present invention will be readily apparent to those skilled in the art in the specification and appended drawings illustrating certain preferred embodiments in which:

Figure 1 is a partial view in side elevation of a one-way engaging device incorporating the principles of the present invention;

Figure 2 is a view similar to Figure 1 showing the parts in a moved position;

Figure 3 is a view similar to Figure 1 showing a modified form of one-way engaging device incorporating the principles of the present invention.

Referring now to the form of the present invention illustrated particularly in Figures 1 and 2, there is illustrated therein a one-way engaging device comprising an inner race 1 having an annular surface 2 to be engaged by the sprags, and an outer race 3 having an annular surface 4 to be engaged by the sprags, surfaces 2 and 4 together defining a circumferential opening. Disposed between the annular surfaces 2 and 4 are a plurality of longitudinally spaced sprags 5 each of which is provided with radially spaced, race-engaging surfaces 6 and 7, which are curved about spaced centers so that attempted relative rotation of the races in the direction of the arrows in Figure 2 effects movement of the sprags to the position illustrated therein and thereby effects a wedging engagement of the sprags 5 between the races 1 and 3, which are thereby connected together for unitary rotation. Rotation of the sprags to the disengaged position by virtue of relative race rotation in the direction indicated by the arrows in Figure 1 results in the sprags permitting free relative rotation of the races in that direction.

Means are provided for spacing and effecting substantially common angular movement of the sprags 5 which comprise an inner annular cage 8 and an outer annular cage 9. The inner cage 8 is provided with a plurality of circumferentially spaced openings 11 through which the sprags 5 extend to engage the inner race 1. The outer cage 9 is provided with a plurality of circumferentially spaced openings 12 through which the outer ends of the sprags 5 extend to engage the outer race 3. The dimensions of the sprags 5, and the dimensions of openings 11 and 12, are such that movement of the sprags 5 from the engaged position of Figure 2 to the disengaged position thereof, and vice versa, results in relative rotation of the cages 8 and 9. These dimensions are also such that the sprags 5 are, throughout this range of tilting movement, substantially always in contact with the sides of the openings 11 and 12 through which they extend, with only a bearing clearance between the sprags and the sides of the cooperating openings existing. This results in substantially common angular movement of each and every one of the sprags throughout the operating range of the device.

In order to bias the sprags toward the position in which they wedgingly engage the races 1 and 3, there is also provided an energizing spring 13 of annular form, preferably fabricated of a suitable resilient sheet metal material. The spring 13 is provided with a plurality of openings 14 therethrough, through which the sprags 5 extend. Each of the openings 14 is formed in part by substantially straight, axially extending sides 15, and opposed thereto is a resilient tab 16, integral with the spring 13, which engages the associated sprag to bias it into engaging position with the opposed side 15 and toward engaging position with the races.

The particular one-way engaging device heretofore described is very similar to one more completely described and claimed in the copending application of Harry P. Troendly et al., Serial No. 379,534, filed September 11, 1953 and entitled "One-Way Clutch," now Patent No. 2,824,636, granted February 25, 1958.

The outer cage 9 is provided with, preferably, a pair of symmetrically spaced, elongated openings 17, while the inner cage 8 is also provided with an equal number of elongated openings 18. Disposed within certain of the openings 11, respectively, is an end 19 of an elongated, centrifugally responsive weight assembly 21 which has an extended toe portion 22, a cam portion 22' spaced therefrom, and which is also formed with a generally inwardly facing opening 23. As it may be seen from a consideration of Figure 1, the shape of end 19 of the weight assembly 21 is precisely the same as the shape of the inwardly facing ends of the sprags 5 so that the cooperation between the portion 19 and the sides of the opening 11 in which it is disposed is the same as the relationship between the sprags 5 and the openings 11. It should also be noted that the opening 23 in the assemblies 21 is such that the adjacent portion of the inner cage 8 is not engaged by the weight 21 when it moves from the position of Figure 2 to that Figure 1 and vice versa, except along that side of the opening 23 which also defines the side of the end 19. It is also important to note that the resilient spring 13 is provided with elongated openings through which the weight assemblies 21 project, the openings being of such dimension that the assemblies 21 may move through their rotating range without contacting the spring 13.

The engaged position of the device is illustrated in Figure 2, the sprags 5 wedgingly engaging between the races 1 and 3 so these units will rotate together. When the direction of relative race rotation changes to that indicated by the arrows in Figure 1, sprags 5 will rotate in a generally clockwise direction, from the view of Figure 2, and normally would assume a position substantially as illustrated in Figure 1 except that sprags 5 would engage with both the race surfaces 2 and 4. However, during overrunning conditions in which, for example, the outer race 3 overruns at substantial speeds, the centrifugal force generated by such overrunning condition effects generally clockwise movement of the weight assemblies 21, which will move to the position illustrated in Figure 1. That is to say, the toe portions 22 of the assemblies 21 will, in response to centrifugal force, be moved outwardly toward the outer race 3 whereupon the camming portions 22' of the assemblies 21 and the ends 19 thereof will effect relative rotation between the cages 8 and 9 which is in the direction of the arrows of Figure 1 and to such a degree that the sprags 5 will be lifted from engagement with the inner race 1, as illustrated in Figure 1.

It will be obvious under such condition that the wear usually experienced on the sprags and races which is occasioned by the friction therebetween at such high overrunning speeds is eliminated. It will also be obvious that when the speed of the outer race increases, the spring 13, acting on the sprags 5 and biasing them toward the position of engagement with both of the races, will effect relative movement of the cages in such a direction that sprags 5 are once again in engagement with both the race surfaces 2 and 4. The device is then in its normal overrunning condition and is ready to reengage immediately upon attempted relative rotation of the races in the direction illustrated by the arrows in Figure 2.

If it is desired to aid the force of spring 13 in opposing the "lift-off" movement occasioned by movement of the weights 21, a separate spring 24 may be provided; one end of spring 24 may be fixedly mounted by suitable means to an axially facing side of the outer cage 9, the opposite end of the spring 24 being connected to the inner cage 8 by means of a lost motion connection, as at 25. It will be seen that the spring 24 has no effect as the sprags 5 tilt through their range of normal engaging and disengaging movements, but becomes effective only when the weight assemblies 21 move the cages to such a degree that sprags 5 disengage the surface 2 of the race 1; in such a condition spring 24 is effective to bias the cages 8 and 9 in a direction which would tend to effect the reengagement of the sprags 5 in both of the race surfaces 2 and 4.

Turning now to the one-way engaging device illustrated in Figure 3, there is shown therein a structure substantially comparable to the structure illustrated in Figures 1 and 2, with the elements illustrated in Figure 3 bearing the same numbers as those in Figures 1 and 2, plus 100. There is shown an inner race 101 having an annular sprag engaging surface 102, and an outer race 103 having an annular sprag engaging surface 104. A plurality of circumferentially spaced sprags 105 are provided, each of which has radially spaced and eccentrically curved race engaging surfaces so as to wedgingly engage the races when tilted in one direction and to permit relative rotation between the races when tilted in the opposite direction. Inner and outer cages 108 and 109, respectively, are provided, the inner cage having a plurality of rectangular openings 111 therein through which the inner ends of the sprags 105 extend while the outer cage 109 has a plurality of rectangular openings 112 therein through which the outer ends of the sprags extend. Sprags 105, and the openings 111 and 112, are such that the sprags 105 are in contact with the circumferentially facing sides of the openings—circumferentially filling the openings—throughout the tilting range of the sprags 105, as previously described. An annular, resilient biasing spring 113 is provided which constantly biases the sprags 105, toward the position of initial engagement with the surfaces 102 and 104.

The outer cage 109 is provided with at least a pair of symmetrically disposed, substantially elongated, rectangular openings 117, while the inner cage 108 is provided with a like number of rectangular openings 118 which are shorter than openings 117. Within the openings 111 adjacent to the openings 118 is respectively disposed a leg portion 119 of a weight assembly 121, which is also provided with an elongated toe portion 122 at one end thereof and a camming portion 122' at the opposite end.

In Figure 3 there is illustrated the position of the device when the sprags 105 wedgingly couple the races 101 and 103 together for unitary rotation. This condition prevails when the races attempt to rotate relative to each other in the direction of the arrows indicated on Figure 3. When the direction of relative race rotation is reversed so as to be opposite to the direction of the arrows in Figure 3, the sprags 105 will be rotated clockwise to their disengaged position. The weight assemblies 121 will similarly tend to rotate slightly in a clockwise direction so that the toe portion 122 extends into the opening 118. When the overrunning speed of, for example, the outer race, becomes sufficiently great so that substantial centrifugal force is applied to the toe portion 122 of each of the assemblies 121 the portions 122 will move outwardly toward the outer race 103. In view of the cooperation of the leg portion 119 of the assembly and the sides of the opening 111—the sides of leg 119 continually engaging the sides of the opening 111 throughout the tilting movement of the assemblies 121— and by virtue of the cooperation between the camming portion 122' and the outer cage 109, the cages 108 and 109 will tend to move in the direction indicated by the arrows in Figure 3. In view of the fact that the sprags 105 are continually in contact with the circumferentially facing sides of the openings 111 and 112 the sprags will, therefore, be maintained in engagement with both of the races 101 and 103 despite any tendency thereof to be lifted free of the races because of an unbalance in their structure. In such a case, it will be seen that the sprags will remain in position to be immediately ready for movement to wedging position between the races as soon as the direction of relative race rotation is in the direction indicated by the arrows in Figure 3.

It should be noted that a device as indicated in Figure 3, no spring comparable to spring 24 in Figure 1 is required.

It will, therefore, be seen that the present invention provides simple, economical and reliable means for either lifting all of the sprags free from one of the races during the overrunning condition, or for ensuring that all of the sprags remain in engagement with both of the races during the overrunning condition despite any tendency of the sprags—due to an inherent unbalance—to move away from one of the races under the effect of centrifugal force. It is also extremely important to note that whether the sprags be moving away from engagement with a race, toward engagement with a race, or maintained in engagement with both races, all of the sprags will be experiencing exactly the same forces and will be moving simultaneously. It will further be obvious that any number and positioning of weight assemblies of 21 or 121 may be employed to effect particularly desirable results.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a one-way engaging device adapted to be disposed between a pair of relatively rotatable races together providing a pair of generally annular and radially spaced surfaces, a plurality of sprags adapted to be disposed between the race surfaces and tiltable through a range of positions including a position in which the races are wedgingly coupled together by said sprags for unitary rotation and a position in which the races are relatively rotatable, a pair of radially spaced cage means, said cage means being relatively rotatably movable with respect to each other and wtih respect to said races, means defining a plurality of circumferentially spaced openings in said cages, each of said sprags extending through an opening in each of said cages, spring means biasing said sprags toward an opening in each of said cages, spring means biasing said sprags toward a position of engagement with the race surfaces, said sprags and said opening defining means being constructed and arranged so that said sprags substantially circumferentially fill said openings with only a bearing clearance between said sprags and said means defining the circumferentially facing portions of said openings as said sprags are tilted through their range of positions, and weight means responsive to centrifugal force engaging both of said cage means during overrunning conditions of said device to effect simultaneous desired positioning of said cages relative to each other.

2. In a one-way engaging device adapted to be disposed between a pair of relatively rotatable races together providing a pair of generally annular and radially spaced surfaces, a plurality of sprags adapted to be disposed between the race surfaces and tiltable through a range of positions including a position in which the races are wedgingly coupled together by said sprags for unitary rotation and a position in which the races are relatively rotatable, a pair of radially spaced cage means, said cage means being relatively rotatably movable with respect to each other and with respect to said races, means defining a plurality of circumferentially spaced openings in said cages, each of said sprags extending through an opening in each of said cages, spring means biasing said sprags toward a position of engagement with the race surfaces, said sprags and said opening defining means being constructed and arranged so that said sprags substantially circumferentially fill said openings with only a bearing clearance between said sprags and said means defining the circumferentially facing portions of said openings as said sprags are tilted through their range of positions, and centrifugally responsive weight means extending through certain of said openings in said cage means engaging both of said cage means and adapted during predetermined overrunning conditions of said device to simultaneously force desired positioning of said cages relative to each other whereby all of said sprags are maintained in a desired relationship with said race surfaces.

3. In a one-way engaging device adapted to be disposed between a pair of relatively rotatable races together providing a pair of generally annular and radially spaced surfaces, a plurality of sprags adapted to be disposed between the race surfaces and tiltable through a range of positions including a position in which the races are wedgingly coupled together by said sprags for unitary rotation and a position in which the races are relatively rotatable, a pair of radially spaced and relatively rotatably movable cage means, means defining a plurality of circumferentially spaced openings in said cages, each of said sprags extending through an opening in each of said cages, spring means biasing said sprags toward a position of engagement with the race surfaces, said sprags and said opening defining means being constructed and arranged so that said sprags substantially circumferentially fill said openings with only a bearing clearance between said sprags and said means defining the circumferentially facing portions of said openings as said sprags are tilted through their range of positions, and centrifugally responsive weight means disposed in circumferential alignment wtih said sprags including means adapted to engage said cage means to effect desired positioning of said cages relative to each other during predetermined overrunning conditions of said device whereby all of said sprags are maintained in a desired relationship with said race surfaces.

4. In a one-way engaging device adapted to be disposed between a pair of relatively rotatable races together providing a pair of generally annular and radially spaced surfaces, a plurality of sprags adapted to be disposed between the race surfaces and tiltable through a range of positions including a position in which the races are wedgingly coupled together by said sprags for unitary rotation and a position in which the races are relatively rotatable, a pair of radially spaced and relatively rotatably movable cage means, means defining a plurality of circumferentially spaced openings in said cages, each of said sprags extending through an opening in each of said cages, spring means biasing said sprags toward a position of engagement with the race surfaces, said sprags and said opening defining means being constructed and arranged so that said sprags substantially circumferentially fill said openings with only a bearing clearance between said sprags and said means defining the circumferentially facing portions of said openings as said sprags are tilted through their range of positions, and centrifugally responsive weight means disposed in circumferential alignment with said sprags and extending through certain of said openings in said cage means including means adapted to engage said cage means to effect desired positioning of said cages relative to each other during predetermined overrunning conditions of said device whereby all of said sprags are maintained in a desired relationship with said race surfaces.

5. In a one-way engaging device adapted to be disposed between a pair of relatively rotatable races together providing a pair of generally annular and radially spaced surfaces, a plurality of sprags adapted to be disposed between the race surfaces and tiltable through a range of positions including a position in which the races are wedgingly coupled together by said sprags for unitary rotation and a position in which the races are relatively rotatable, a pair of radially spaced and relatively rotatably movable cage means, means defining a plurality of circumferentially spaced openings in said cages, each of said sprags extending through an opening in each of said cages, spring means biasing said sprags toward a position of engagement with the race surfaces, said sprags and said opening defining means being constructed and arranged so that said sprags substantially circumferentially fill said openings with only a bearing clearance between said sprags and said means defining the circumferentially facing portions of said openings as said sprags are tilted through their range of positions, means responsive to centrifugal force constructed and arranged to effect disengagement of said sprags from one of the races during predetermined overrunning conditions of said device, additional spring means, means fixedly mounting one end of said additional spring means to one of said pair of cages and lost motion means mounting the opposite end of said additional spring means to the other of said pair of cages whereby said additional spring means are effective only during said predetermined overrunning conditions to bias said cages against movement by said means responsive to centrifugal force.

6. In a one-way engaging device adapted to be disposed between a pair of relatively rotatable races together providing a pair of generally annular and radially spaced surfaces, a plurality of sprags adapted to be disposed between the race surfaces and tiltable through a range of positions including a position in which the races are wedgingly coupled together by said sprags for unitary rotation and a position in which the races are relatively rotatable, a pair of radially spaced and relatively rotatably movable cage means, means defining a plurality of circumferentially spaced openings in said cages, each of said sprags extending through an opening in each of said cages, spring means biasing said sprags toward a position of engagement with the race surfaces, said sprags and said opening defining means being constructed and arranged so that said sprags substantially circumferentially fill said openings with only a bearing clearance between said sprags and said means defining the circumferentially facing portions of said openings as said sprags are tilted through their range of positions, and centrifugally responsive weight means disposed in circumferential alignment with said sprags and extending through certain of said openings in said cage means including means adapted to engage said cage means to effect disengagement of said sprags from one of the races during predetermined overrunning conditions of the device.

7. In a one-way engaging device adapted to be disposed between a pair of relatively rotatable races together providing a pair of generally annular and radially spaced surfaces, a plurality of sprags adapted to be disposed between the race surfaces and tiltable through a range of positions including a position in which the races are wedgingly coupled together by said sprags for unitary rotation and a position in which the races are relatively rotatable, a pair of radially spaced and relatively rotatably movable cage means, means defining a plurality of circumferentially spaced openings in said cages, each of said sprags extending through an opening in each of said cages, spring means biasing said sprags toward a position of engagement with the race surfaces, said sprags and said opening defining means being constructed and arranged so that said sprags substantially circumferentially fill said openings with only a bearing clearance between said sprags and said means defining the circumferentially facing portions of said openings as said sprags are tilted through their range of positions, centrifugally responsive weight means disposed in circumferential alignment with said sprags and extending through certain of said openings in said cage means including means adapted to engage said cage means to effect disengagement of said sprags from one of the races during predetermined overrunning conditions of the device, additional spring means, means fixedly mounting one end of said additional spring means to one of said pair of cages and lost motion means mounting the opposite end of said additional spring means to the other of said pair of cages whereby said additional spring means are effective only during said predetermined overrunning conditions to bias said cages against movement by said centrifugally responsive weight means.

8. In a one-way engaging device adapted to be disposed between a pair of relatively rotatable races together providing a pair of generally annular and radially spaced surfaces, a plurality of sprags adapted to be disposed between the race surfaces and tiltable through a range of positions including a position in which the races are wedgingly coupled together by said sprags for unitary rotation and a position in which the races are relatively rotatable, a pair of radially spaced and relatively rotatably movable cage means, means defining a plurality of circumferentially spaced openings in said cages, each of said sprags extending through an opening in each of said cages, spring means biasing said sprags toward a position of engagement with the race surfaces, said sprags and said opening defining means being constructed and arranged so that said sprags substantially circumferentially fill said openings with only a bearing clearance between said sprags and said means defining the circumferentially facing portions of said openings as said sprags are tilted through their range of positions, and centrifugally responsive weight means disposed in circumferential alignment with said sprags and extending through certain of said openings in said cage means including means adapted to engage said cage means to effect the application of a bias to said sprags during said predetermined overrunning conditions in a direction tending to maintain said sprags in engagement with both of the races.

9. In a one-way engaging device adapted for use between a pair of relatively rotatable races, centrifugally responsive means operable selectively to connect said races, said means including one or more sprags wedgingly engageable with said races, and weight means operable upon actuation to vary the relative position of said sprags with respect to said races, said weight means being connected to and carried by at least one of said sprags.

10. A power transmission apparatus comprising a driving member, a driven member radially spaced from said driving member, a sprag interposed between said driving member and said driven member and selectively actuatable to connect said driving member and said driven member, and centrifugally responsive means connected to and carried by said sprag for actuating said sprag in response to a speed differential between said driving member and said driven member.

11. A power transmission apparatus comprising a driving member, a driven member radially spaced from said driving member, a plurality of sprags interposed between said driving member and said driven member, means connecting said sprags each to the other, and centrifugally responsive means operable upon actuation to vary the speed ratio between said driving member and said driven member, said centrifugally responsive means including weight means connected to and carried by at least one of said sprags.

12. In a one-way engaging device adapted for use between a pair of races, an inner cage, an outer cage, said cages being rotatable relative to said races and relative to each other, means defining a plurality of circumferentially spaced openings in said cages, a plurality of sprags respectively extending through an opening in said inner cage and through an opening in said outer cage, means defining race engaging surfaces on said sprags constructed and arranged to wedgingly engage said sprags between said races upon relative rotation therebetween in one direction whereby said races rotate together in unison and to permit relative rotation therebetween in the opposite direction, means biasing said sprags toward engagement with said races, and means constructed and arranged to disconnect said sprags from one of said races during predetermined overrunning conditions of said device comprising centrifugally responsive means mounted adjacent one side of said cages and adapted to effect relative rotation therebetween during said predetermined conditions.

13. In a one-way engaging device adapted for use between a pair of races, an inner cage, an outer cage, said cages being rotatable relative to said races and relative to each other, means defining a plurality of circumferentially spaced openings in said cages, a plurality of sprags respectively extending through an opening in said outer cage and through an opening in said inner cage, means defining race engaging surfaces on said sprags constructed and arranged to wedgingly engage said sprags between said races upon relative rotation therebetween in one direction whereby said races rotate together in unison and to permit relative rotation therebetween in the opposite direction, means biasing said sprags toward engagement with said races, and means constructed and arranged to disconnect said sprags from one of said races during predetermined overrunning conditions of said device comprising elongated weight means mounted adjacent one side of said cages and adapted to effect relative rotation therebetween during said predetermined conditions.

14. In a one-way engaging device adapted for use between a pair of races, an inner cage, an outer cage, said cages being rotatable relative to said races and relative to each other, means defining a plurality of circumferentially spaced openings in said cages, a plurality of sprags respectively extending through an opening in said outer cage and through an opening in said inner cage, means defining race engaging surfaces on said sprags constructed and arranged to wedgingly engage said sprags between said races upon relative rotation therebetween in one direction whereby said races rotate together in unison and to permit relative rotation therebetween in the opposite direction, means biasing said sprags toward engagement with said races, and means constructed and arranged to disconnect said sprags from one of said races during predetermined over-running conditions of said device comprising elongated weight means in axial alignment with both of said cages adapted to effect relative rotation therebetween during said predetermined conditions.

References Cited in the file of this patent

UNITED STATES PATENTS

| 2,173,604 | Dodge | Sept. 19, 1939 |
| 2,385,799 | Dodge | Oct. 2, 1945 |
| 2,683,509 | Jandasek | July 13, 1954 |

FOREIGN PATENTS

| 1,095,050 | France | Dec. 15, 1954 |